July 26, 1966     H. M. L. BOSTEELS     3,262,623
CONTROL COMPONENT FOR WIRE-FEEDING WELDING ASSEMBLY
Filed Jan. 11, 1965     2 Sheets-Sheet 1
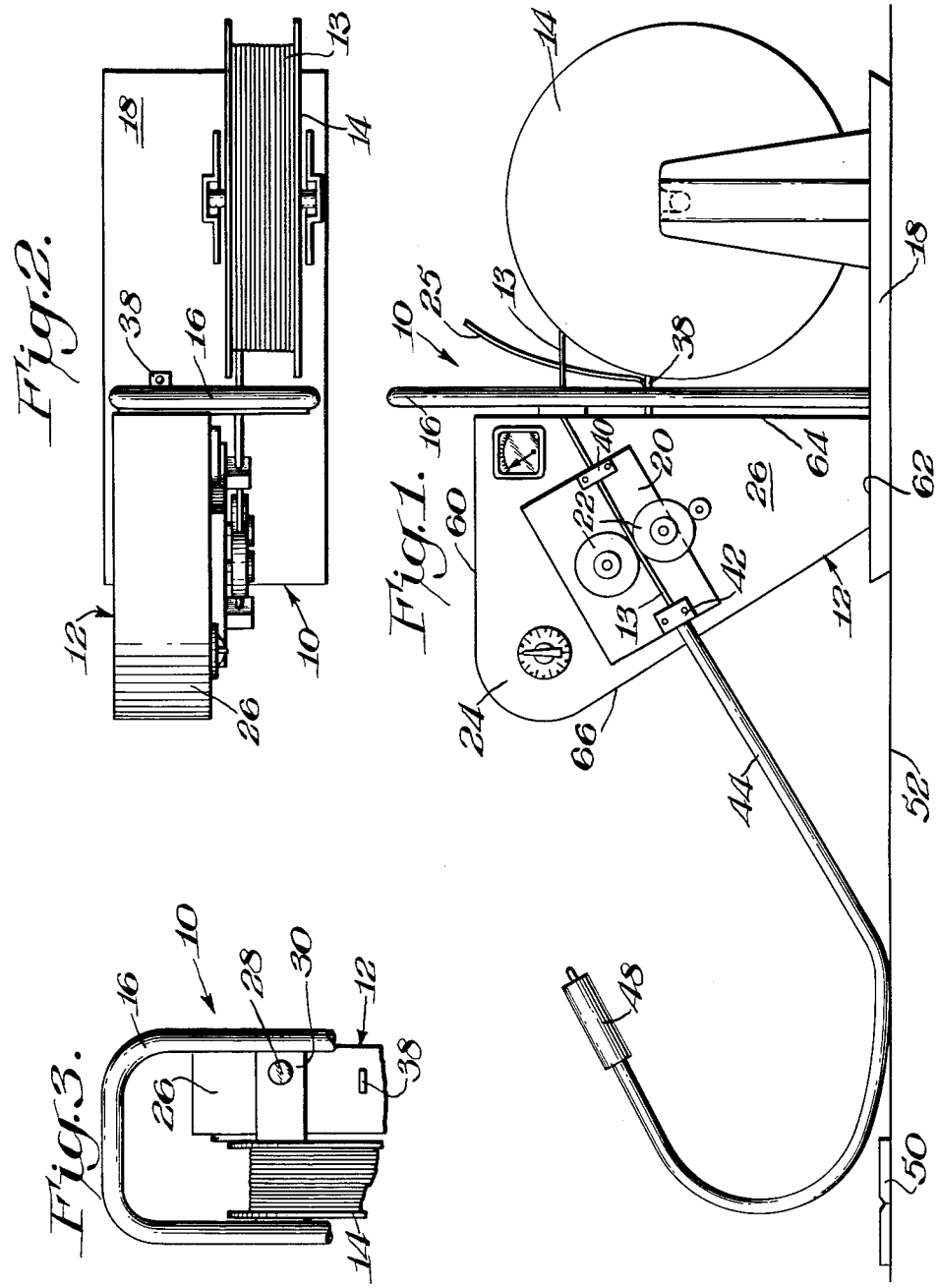
INVENTOR
*Henri Marie Louis Bosteels*
BY *Connolly and Hutz*
ATTORNEYS

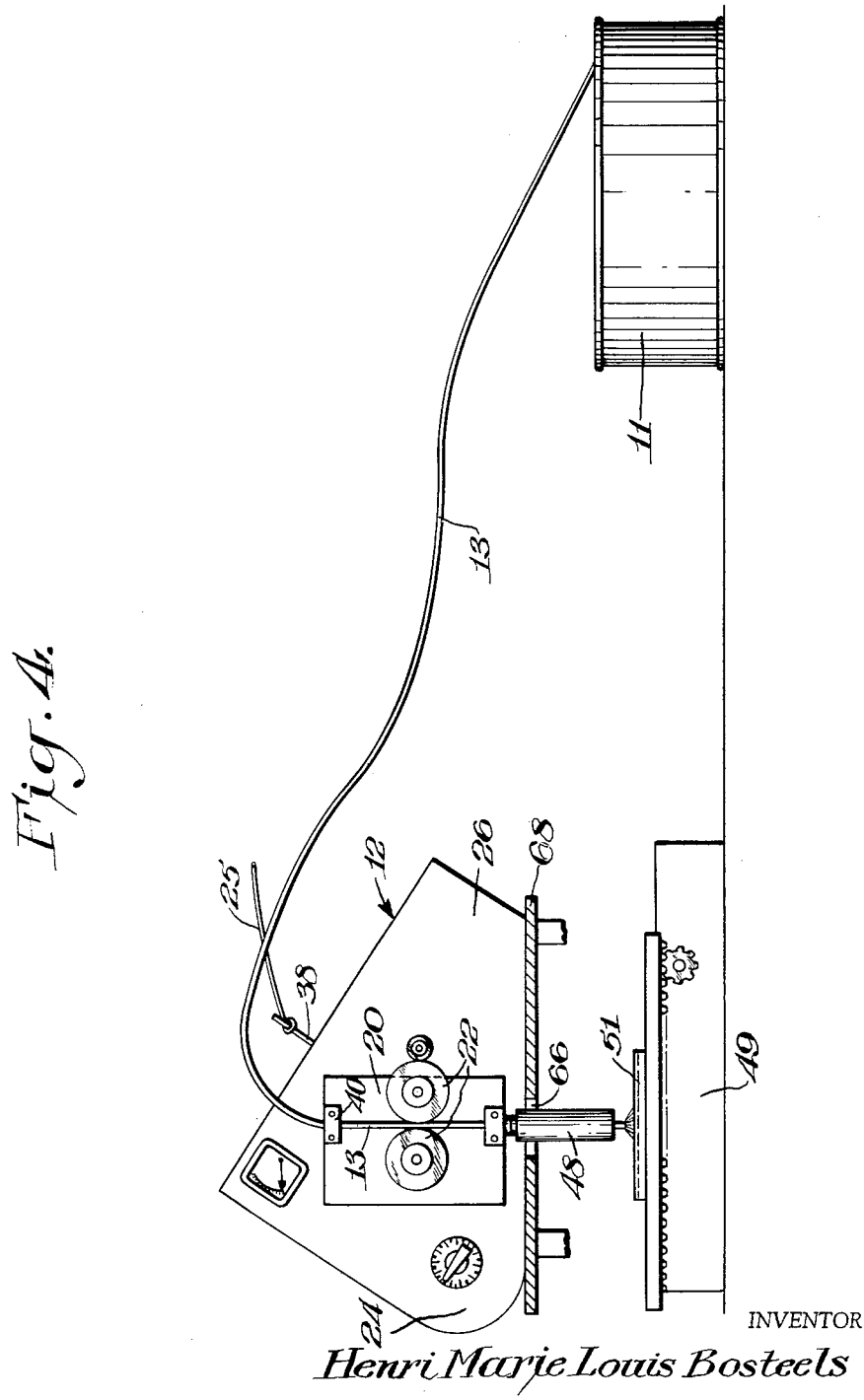

United States Patent Office 3,262,623
Patented July 26, 1966

3,262,623
CONTROL COMPONENT FOR WIRE-FEEDING
WELDING ASSEMBLY
Henri Marie Louis Bosteels, Lausanne, Switzerland,
assignor to Central Welding Research Lab. Ltd., a
corporation of Bermuda
Filed Jan. 11, 1965, Ser. No. 424,686
4 Claims. (Cl. 226—174)

This application is a continuation-in-part of copending application, Serial No. 311,779, filed September 26, 1963.

This invention relates to a control component having a portable wire feeding assembly, and it more particularly relates to such a welding assembly that is ordinarily adapted for both fully automatic and semi-automatic operation.

Semi-automatic wire feeding welding assemblies include control components for feeding filler wire from, for example, a wire reel to a torch for operating on a workpiece positioned under the assembly. When such devices are mounted in a vertical position, the wire is fed horizontally from the control component into a heavy cable connected to the torch. As a result, the wire must take a sharp turn or bend to be fed downwardly toward the floor to the torch. These sharp bends frequently cause the wire to break due to the great weight of the cable. Additionally when the wire is fed through the cable, the wire may become jammed or clogged in the cable. Such semi-automatic assemblies frequently use complicated resilient supports at the sharp turns to minimize breaks. However, these supports are not only complicated, but also are of limited effectiveness.

An object of this invention is to provide a control component for a wire feeding welding assembly which feeds the wire without sharp bends or turns when the assembly is vertically mounted.

Another object is to provide such a control component which can effectively operate fully automatically when it is mounted on its side.

In accordance with this invention, the control component includes a control unit mounted in a casing. The wire feeding head for the control component is advantageously disposed at an acute angle between 20° and 50° from the horizontal. Accordingly, the wire is smoothly fed from, for example, a wire reel to the torch cable without any sharp turns or bends.

In an advantageous form of this invention, the casing is harp shaped with the discharge side being inclined with respect to the horizontal and substantially normal to the inclination of the feeding head. Accordingly, the control component may be mounted on its discharge side above moving workpieces so that the wire is fed vertically toward the torch for fully automatic operation.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention;

FIG. 2 is a top plan view of the embodiment shown in FIG. 1;

FIG. 3 is a side elevational view of a portion of the embodiment shown in FIGS. 1-2; and FIG. 4 is a side view in elevation of the embodiment shown in FIGS. 1-3 in a different phase of operation.

In FIGS. 1-4 is shown a semi-automatic wire feeding welding assembly 10 including a wire feeding and control component or device 12, and a wire reel 14 mounted upon opposite sides of a handle structure 16 secured to a substantial central area of a base 18. Device 12 is, for example, substantially functionally similar to that described in copending commonly assigned U.S. Patent application S.N. 246,290, filed December 13, 1962, by the same inventor. Control component 12 includes a wire feeding component or head 20 having a pair of wire feeding rollers 22 with a control unit 24 disposed within casing 26. Control component 12 is detachably secured in a vertical position to assembly 10 by cap screw 28 inserted through bracket plate 30 secured to the upper portion of handle structure 16 as most clearly shown in FIG. 3.

As shown in FIG. 1, feeding head 20 is disposed at an acute angle with respect to the horizontal when component 12 is vertically mounted. This angle is shown in FIG. 1 as being approximately 30° with respect to the horizontal. However, feeding head 20 may also effectively operate when it is inclined within the range of 20° to 50°. As shown in FIG. 1 the wire 13 is fed from reel 14 through wire guide block 40 by rollers 22 and is discharged through wire guide block 42 into for example, cable 44 connected to torch 48 for operation on workpieces 50. Cable 44 includes, for example, the electrical and cooling components for torch 48. The wire is accordingly, smoothly fed into cable 44 to the floor 52 without any sharp bends or turns. The operator can then carry torch 48 for operation on workpiece 50. The welding current for assembly 10 is supplied by cable 25 which connects terminal 38 to a generator (not shown).

As shown in FIG. 4, the unique shape of component 12 enables it to operate when mounted on its side for fully automatic operation with moving workpieces. As shown in FIGS. 1 and 4 casing 26 is harp shaped and includes a pair of parallel sides 60 and 62 joined by a perpendicular side 64. The discharge side 66 of casing 26 however is inclined with respect to the horizontal and is substantially perpendicular or normal to the inclination of feeding head 20. As a result, as shown in FIG. 4 component 12 can be mounted on its side by resting discharge side 66 upon support 68. Torch 48 is secured for example directly to wire feed block 42 and is pointed downwardly above moving workpieces 51. Workpieces 51 are mounted on the bed of a machine tool 49, such as a lathe or milling machine, and are fed toward torch 48. Accordingly, wire 13 is fed from, for example, payoff pack 11 to feeding head 20 and directly downwardly toward torch 48 without any sharp bends or turns.

What is claimed is:

1. A control component for a wire-feeding welding assembly having a torch and a flexible cable connected thereto comprising a casing, a vertically disposable straight side on said casing, means for mounting said casing in an upright position with said straight side disposed substantially perpendicular with respect to the horizontal, a control unit in said casing, an inclined feeding head on said casing for feeding wire into said flexible cable to a floor, and said feeding head being inclined downwardly at an angle between approximately 20° and 50° with respect to the horizontal whereby said wire merges smoothly with the floor after it is fed from said feeding head.

2. A control component as set forth in claim 1 wherein said feeding head is inclined at an angle of approximately 30° with respect to the horizontal.

3. A control component for a wire-feeding welding assembly having a torch and a flexible cable connected thereto comprising a casing, a control unit in said casing, a feeding head on said casing for feeding wire into said flexible cable to a floor, said feeding head being inclined downwardly at an angle between approximately 20° and 50° with respect to the horizontal whereby said wire merges smoothly with the floor after it is fed from said feeding head, said casing being harp-shaped including a vertically disposable straight side and an inclined discharge side, and said discharge side being substantially perpendicular to said feeding head for automatic operation of said assembly.

4. A control component as set forth in claim 3 wherein said straight side includes securing means for mounting said component in a vertical position.

References Cited by the Examiner
UNITED STATES PATENTS 1,431,916   10/1922   Anderson _____ 226—188

ROBERT B. REEVES, *Primary Examiner.*